March 3, 1942.  J. S. THOMPSON  2,274,875
ELECTROMAGNETIC MOTOR
Filed Oct. 28, 1939
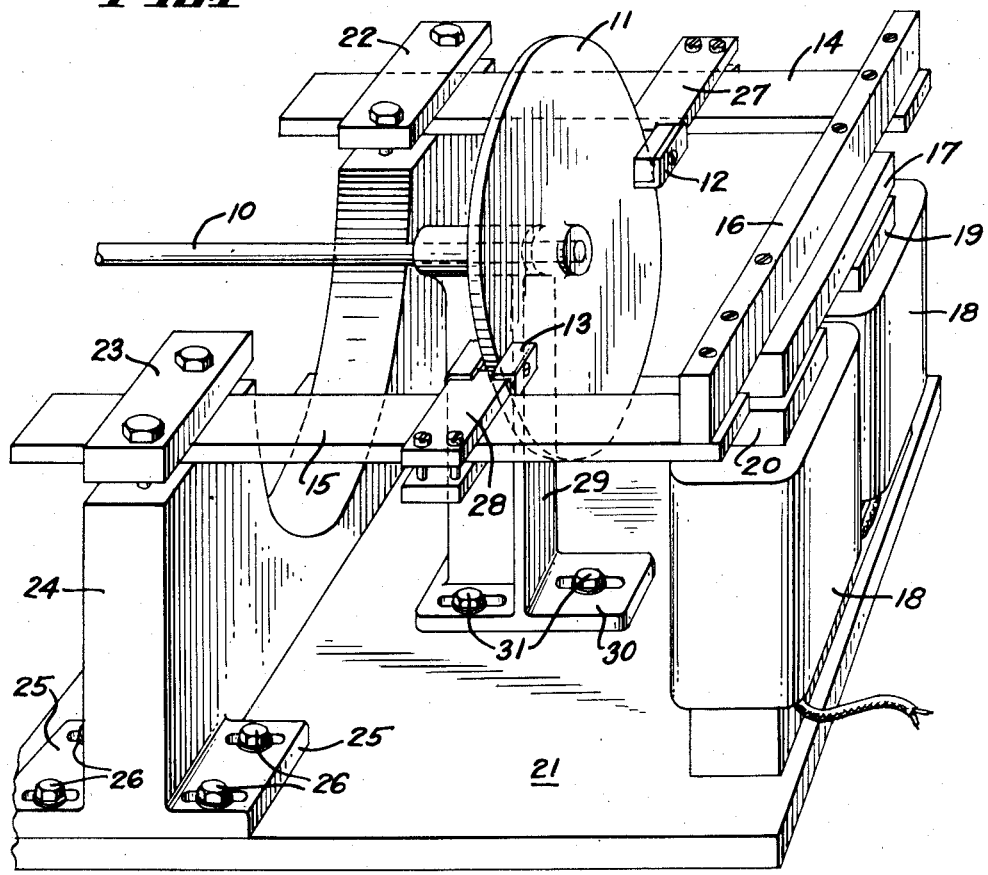
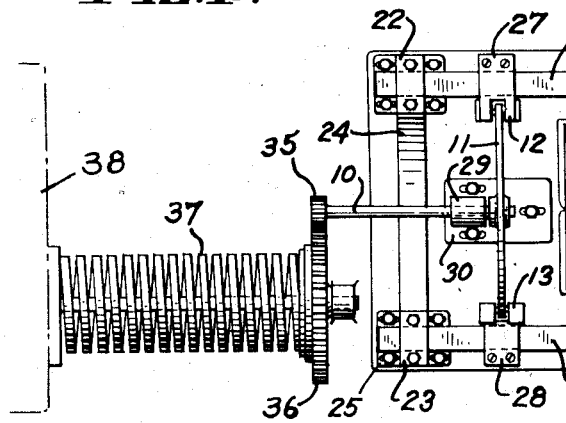
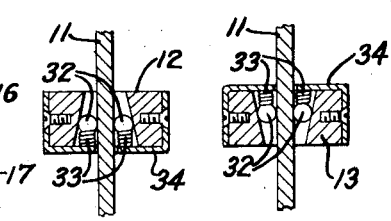
INVENTOR.
JOSEPH S. THOMPSON.
BY
ATTORNEY.

Patented Mar. 3, 1942

2,274,875

UNITED STATES PATENT OFFICE 2,274,875

ELECTROMAGNETIC MOTOR

Joseph S. Thompson, San Francisco, Calif.

Application October 28, 1939, Serial No. 301,781

7 Claims. (Cl. 172—126)

The present invention relates to electromagnetic motors and more particularly to an electromagnetic motor of the vibratory type by means of which a uni-directional motion can be imparted to a driven member.

An object of the invention is to provide a simple and practical electromagnetic motor of the vibratory type which is capable of producing a high power slow speed motion in a simple and inexpensive manner.

Another object of the invention is to provide an electromagnetic motor of the vibratory type having means of adjustment whereby its period of vibration may be adjusted to render it operative substantially at resonance when operating under any desired load condition.

Another object of the invention is to provide an electromagnetic motor of the vibratory type in which a vibrating armature member is arranged to exert a one-way driving force upon a driven member during both its attracted and return stroke of vibration.

Other objects and advantages of the invention will be in part evident to those skilled in the art and in part pointed out hereinafter in connection with the accompanying drawing wherein there is shown by way of illustration and not of limitation preferred embodiments thereof.

In the drawing:

Figure 1 is a perspective view of an electromagnetic motor constructed in accordance with the present invention and designed primarily for the purpose of producing rotary motion, Figures 2 and 3 are fragmentary sectional views of the opposed rotary disc clutching devices illustrated in Figure 1 of the drawing, and Figure 4 is a reduced plan view showing a possible use for a motor constructed in accordance with the invention.

As is clearly illustrated in Figure 1 of the drawing, the motor contemplated by the present invention comprises a driving shaft 10 upon the end of which there is fixed a disc-like armature 11 that is adapted to be driven with a uni-directional motion by oppositely disposed vibratory disc engaging clutch members 12 and 13. The disc engaging clutch members 12 and 13 are here shown as engaging the disc-like armature 11 at diametrically opposed points and as respectively carried by vibratable bar-like members 14 and 15. The vibratable bar-like members 14 and 15 are connected together at their free ends by an armature supporting member 16 so that they will vibrate in unison and attached to the armature supporting member 16 there is an armature 17 that is adapted to be influenced by an alternating or pulsating magnetic field provided by one or more electromagnetic coils 18 which may be energized by a pulsating direct current and/or an alternating current source of power.

With this arrangement it will be seen that as the vibratory bar-like members 14 and 15 vibrate under the influence of the electromagnetic field produced by the coils 18, the disc clutching members 12 and 13 will move up and down with respect to the axis of the armature disc 11 and as a result of their reversed one-way action, as will hereinafter appear, the vibratory movements of the bar-like members 14 and 15 will be transmitted to the disc-like armature 11 in a common direction. For example: In the device illustrated the bar-like member 14 with its clutching device 12 will operate during its attracted stroke to exert a downward force at one edge of the disc-like armature 11 and the bar-like member 15 with its clutching means 13 will operate to impart an upward motion to the opposite edge of the disc armature 11 on the return stroke of the bar-like members 14 and 15. In this operation the disc armature 11 will be rotated in a substantially continuous manner in one direction and will be held at all times by one or the other of the clutch members 12 and 13 against any reverse rotational movement.

The exciting coils 18 are shown as mounted upon a U-shaped magnetic field structure having poles 19 and 20 that are spanned by the armature 17. While this is the preferred arrangement, it is to be understood that a single exciting coil 18 may be used by providing a magnetic path from the lower end of one of the coils 18 to the fixed end and through the vibratable members 14 and 15 to complete the magnetic circuit. In the drawing, the magnetic field producing coils 18 with their field core structure are shown as securely mounted upon a metallic base 21 while the vibratable bar-like members 14 and 15 are adjustably mounted by means of clamping plates 22 and 23 upon an adjustable pedestal-like support 24. The adjustability of the support 24 is provided for by slotted flanges 25 through which securing bolts 26 extend and engage the base 21. With this arrangement it will be seen that by changing the position of the pedestal-like support 24 with respect to the magnetic poles 19 and 20 of the field structure and similarly adjusting the vibratable bar-like members 14 and 15 so as to maintain a cooperating relation between the armature 17 and the magnetic poles 19 and 20, it will be possible to vary the effective lengths of the vibratable bar-like members 14 and 15 and thus change their period of vibration independently of the frequency of the magnetic field exciting current. In order to permit this adjustment in the length of the bar-like members 14 and 15 without necessitating an axial displacement of the disc armature 11, the clutch members 12 and 13 are also shown as adjustably secured upon the vibratable bar-like members 14 and 15 by means of clamp-like supports 27 and 28.

In addition to the above adjustable features, the shaft 10 with the disc-like armature 11 is shown as journaled upon a bearing pedestal 29 which is likewise adjustable upon the base 21, this adjustment being provided in a manner similar to that illustrated for the support 24 by providing a slotted flanged base 30 through which securing bolts 31 are threaded into the base 21. By this latter adjustment it is possible, with any predetermined effective length in the vibratable bar-like members 14 and 15, to vary the magnitude of movement which will be imparted to the disc armature 11 by the clutch members 12 and 13 as the bar-like members 14 and 15 vibrate in response to the magnetic field established by the coils 18. At this point it will also be observed that the same result can be obtained, with the disc armature 11 in a predetermined position, by shortening and/or lengthening the vibratable bar-like members 14 and 15 through an adjustment in the position of their support 24.

Reference is now made to Figures 2 and 3 of the drawing, wherein the details of the clutching members 12 and 13 are clearly illustrated. While these disc engaging clutch members 12 and 13 may take many and varied forms, it is desirable that they be of such a character as will permit a slight axial movement of the disc-like armature 11 as these devices move up and down in a slightly curved path. As here illustrated, the clutching members 12 and 13 are identical in form, except that the clutch member 12 has downwardly and outwardly opposed flaring surfaces between the disc-like armature 11 and which there is provided oppositely disposed balls and/or cylindrical rollers 32, while the clutch member 13 has upwardly and outwardly flaring surfaces against which the balls and/or rollers 32 operate. The balls and/or rollers 32 are shown as held in frictional engaging contact with the opposite faces of the disc armature 11 and one or the other of the inclined surfaces of the clutching members 12 and 13 by means of small springs 33 which are held in position by suitable retainers 34 carried by the members 12 and 13.

With the above described arrangement it will be seen that for any given strength and frequency of the magnetic field produced by the coils 18 the amplitude of oscillation of the vibrating armature 17 will tend to be at a maximum when resonance occurs between the natural mechanical frequency of the vibratable bar-like members 14 and 15 and their supported mass and the frequency of the alternating magnetic field. As long as such resonance is obtained the amplitude of vibration will tend to decrease as the load on the motor is increased, this being due to the action of the clutches 12 and 13 in absorbing energy from the vibrating bar-like members 14 and 15. As a result any increase in the load upon the shaft 10 not only tends to reduce the amplitude of vibration of the bar-like members 14 and 15, but also tends to change their natural frequency of mechanical vibration. This may tend to raise the natural frequency of vibration by effectively shortening the length of the vibratable members 14 and 15 if the clutch devices 12 and 13 are connected to the vibratable members 14 and 15 at points considerably closer to the fixed end of the vibratable members 14 and 15 than the free ends thereof. On the other hand, if the clutch members 12 and 13 are attached to the vibratable members 14 and 15 at or near the armature 17, this may tend to lower the natural frequency of vibration. In any case, the adjustment of the natural period of the vibratable members 14 and 15 at no load may be made so that at any desired value of load resonance will occur or will be approached and tend to counteract the natural decrease of amplitude as the load is applied.

In other words, with the arrangement above described it is possible to effect an adjustment of the natural vibrating frequency of the vibratable bar-like members 14 and 15 which will be such that any additional load upon the motor will cause this natural frequency to approach more nearly the resonance condition and thus improve the output speed, regulation and torque characteristics of the motor.

While the motor described above may find many useful applications, it will be found particularly useful under conditions where a slow speed uni-directional and non-reversible drive is desired. The most common expedient now in use for a non-reversible drive employing a conventional electric motor is to connect the motor to the load through a worm carried by the motor shaft. This, as is well understood, will provide a drive which is non-reversible. A contemplated use for the motor described above is illustrated in Figure 4 of the drawing, wherein the motor is associated with an energy storing spring, such as may be used to intermittently effect the operation of any suitable mechanism. In this figure of the drawing the shaft 10 is shown as having a pinion 35 which cooperates with a gear 36 that is secured to one end of an energy storing spring 37 such as may be used, for example, to supply energy for intermittently opening and closing an automatic circuit breaker mechanism 38, shown by dot and dash lines, in the manner clearly illustrated and described in a co-pending application, Serial No. 162,498, filed September 4, 1937, by August C. Schwager and assigned to the assignee of this application.

While I have, for the sake of clearness and in order to disclose the invention so that the same can be readily understood, described and illustrated specific devices and arrangements, I desire to have it understood that this invention is not limited to the specific means disclosed, but may be embodied in other ways that will suggest themselves to persons skilled in the art. It is believed that this invention is new and it is desired to claim it so that all such changes as come within the scope of the appended claims are to be considered as part of this invention.

Having thus described my invention, what I claim and desire to secure by Letters Patent is—

1. In an electromagnetic motor of the character described, the combination of a rotatably mounted disc-like load carrying element, a vibratory bar-like member of elastic material fixed at one end and extending adjacent the periphery of said disc-like load carrying element, electromagnetic means for imparting vibratory motion to said vibratory member, clutch means carried by said vibratory member forming a uni-directional driving connection between said vibratory member and said rotatably mounted disc-like load carrying element, and means for adjustably positioning said disc-like load carrying element and said uni-directional driving connection forming means at different points intermediate the fixed and the free end of said vibratory member where at a given load the torque exerted upon said disc-like load carrying element by said clutch means will approach its maximum value when the period of vibration of said vibratory member approaches resonance under the influence of said electromagnetic means.

2. In an electromagnetic motor of the character described, the combination of a driving shaft having a disc armature secured thereupon, an elastic vibratory member fixedly supported at one end and adapted to vibrate in a plane tangent to the periphery of said disc armature, an electromagnetic field producing means at the free end of said vibratory member adapted when energized with alternating current to vibrate said vibratory member, a clutch means carried by said vibratory member intermediate its ends and operatively engaging said disc armature, and means for adjusting the position of the fixed support of said vibratory member axially with respect to said disc armature, whereby the effective length of said vibratory member may be changed to produce a maximum torque on said disc armature as the period of vibration of said vibratory member approaches resonance under the influence of said electromagnetic means.

3. In an electromagnetic motor of the character described, the combination of a driving shaft having a disc armature secured thereupon, an elastic vibratory member fixedly supported at one end and having its free end adapted to vibrate in a plane tangent to the periphery of said disc armature, an electromagnetic field producing means associated with said vibratory member and adapted when energized with alternating current to vibrate said vibratory member, a clutch means carried by said vibratory member forming a one-way driving connection between said vibratory member and said disc armature, and means for adjusting the fixed support of said vibratory member with respect to said electromagnetic means, whereby the natural period of vibration of said vibrating member may be changed to provide a maximum torque on said disc armature by said clutch means as the period of vibration of said vibratory member approaches resonance under the influence of said electromagnetic means.

4. In an electromagnetic motor of the character described, the combination of a base forming member, a periodic magnetic field producing means mounted at one end of said base forming member, a support at the other end of said base forming member, an armature disposed in cooperating relation with said magnetic field producing means, a pair of spaced spring steel vibratory members carried by said support and secured at their free ends to said armature, a disc-like load carrying element rotatably mounted between said vibratory members, clutch forming means intermediate the ends of said vibratory members adapted to engage and impart a uni-directional rotary motion to said disc-like load carrying element as said vibratory members are vibrated by said armature under the influence of said magnetic field, and means by which the position of said support and said disc-like load carrying element may be adjusted with respect to said armature and said magnetic field producing means, whereby said vibratory members will operate in resonance with said periodic magnetic field producing means at any desired load upon said disc-like load carrying element.

5. In an electromagnetic motor of the character described, the combination of a base forming member, a periodic magnetic field producing means mounted at one end of said base forming member, a support at the other end of said base forming member, an armature disposed in cooperating relation with said magnetic field producing means, a pair of spaced spring steel vibratory members carried by said support and secured at their free ends to said armature, a disc-like load carrying element rotatably mounted between said vibratory members, clutch forming means intermediate the ends of said vibratory members adapted to engage and impart a uni-directional rotary motion to said disc-like load carrying element as said vibratory members are vibrated by said armature under the influence of said magnetic field, and means by which the position of said support may be adjusted with respect to said armature and said magnetic field producing means, whereby said vibratory members will operate in resonance with said periodic magnetic field producing means at any desired load upon said disc-like load carrying element.

6. In an electromagnetic motor of the character described, the combination of a base forming member, a periodic magnetic field producing means mounted at one end of said base forming member, a support at the other end of said base forming member, an armature disposed in cooperating relation with said magnetic field producing means, a pair of spaced spring steel vibratory members carried by said support and secured at their free ends to said armature, a disc-like load carrying element rotatably mounted between said vibratory members, clutch forming means intermediate the ends of said vibratory members adapted to engage and impart a uni-directional rotary motion to said disc-like load carrying element as said vibratory members are vibrated by said armature under the influence of said magnetic field, and means by which the position of said disc-like load carrying element may be adjusted with respect to said armature and said magnetic field producing means, whereby said vibratory members will operate in resonance with said periodic magnetic field producing means at any desired load upon said disc-like load carrying element.

7. In an electromagnetic motor of the character described, the combination of a vibrating mechanical system comprising a pair of spaced parallel extending vibratory arms having their free ends connected together and carrying a magnetic armature, an alternating electromagnetic field producing means associated with said armature for imparting a periodic vibration to said vibratory arms, a drive shaft mounted centrally between said vibratory arms and disposed on an axis parallel with and in the normal plane of said vibratory arms, a driving disc secured upon said shaft, disc engaging means carried by each of said vibratory arms one of which is adapted to impart rotation to said driving disc when said armature is attracted by said electromagnetic field producing means and the other of which is adapted to impart a corresponding rotation to said disc when said armature is released by said electromagnetic field producing means, and means for changing the length of said vibratory arms and the position of said driving disc and the disc engaging means carried by said vibratory arms with respect to said armature to thus vary the natural period of vibration of said vibrating mechanical system, whereby said vibrating mechanical system may be adjusted to vibrate in resonance with said alternating electromagnetic field producing means with any given load upon said shaft.

JOSEPH S. THOMPSON.